United States Patent Office 3,655,620
Patented Apr. 11, 1972

3,655,620
2-CARBOXY-4,4,6-TRIMETHYL-2,5-HEPTADIENOIC ACID
Marc Julia, Paris, France, assignor to Rhone-Poulenc S.A., Paris, France
No Drawing. Original application Oct. 9, 1967, Ser. No. 673,994, now Patent No. 3,558,659, dated Jan. 26, 1971. Divided and this application May 1, 1969, Ser. No. 843,249
Claims priority, application France, Oct. 12, 1966, 79,723; Feb. 24, 1967, 96,477, 96,478
Int. Cl. C07c 57/02
U.S. Cl. 260—537 N         1 Claim

ABSTRACT OF THE DISCLOSURE

Pyrocine, an intermediate in the preparation of chrysanthemic acid, is made by cyclizing 2-carboxy-4,4,6-trimethyl-2,5-heptadienoic acid.

---

This application is a division of my copending application Ser. No. 673,994 filed Oct. 9, 1967, now Pat. No. 3,558,659, issued Jan. 26, 1971.

This invention relates to the preparation of pyrocine. Pyrocine, which is the lactone of formula:

is an intermediate in the preparation of chrysanthemic acid, and can be prepared by reaction of a bromacetic ester with 2-methyl-2-hexene-5-one, as described in French patent specification No. 1,269,127.

It has now been found that pyrocine may be prepared by decarboxylation and cyclization of the diacid of formula

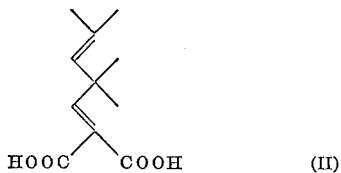

by heating it to at least 160° C. The change in the carbon skeleton has no precedent.

The diacid of Formula II, which is a new compound may be obtained by the total saponification, by conventional saponification techniques, of a compound of formula:

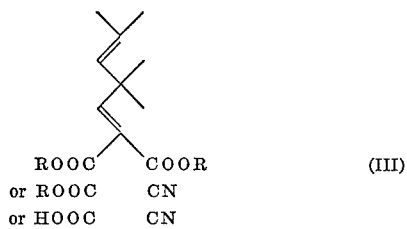

in which R is lower alkyl, for example methyl or ethyl.

The diester of Formula III may be obtained by one of the processes described below:

(1) The process which comprises reacting 2,2,4-trimethyl-3-pentenal or 2,2,4-trimethyl-4-pentenal with an alkyl malonate in accordance with the following reaction scheme:

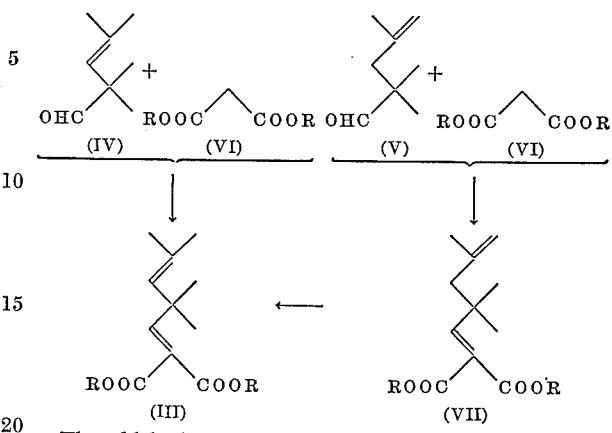

The aldehyde of Formula IV is a known compound, which may be obtained by hydrolysis of 2,2,4,4-tetramethyl-cyclobutanediol-1,3- [Hasek et al., J. Org. Chem. (1961), pp. 700 and 3130] or by acid hydrolysis of the cyclopropane derivative of formula:

The aldehyde of Formula V is also a known compound, which may be prepared by heating methallyl alcohol with isobutyraldehyde in the presence of para-toluenesulphonic acid [Kent C. Brannock, J. Amer. Chem. Soc. 81 (1959), pp. 3379–3383].

The condensation of the aldehydes of Formula IV or V with the diester of Formula VI takes place in accordance with the conventional methods of condensing aldehydes and ketones with compounds having a reactive methylene group, for example by the method used by Cope in the preparation of cyclohexenylacetonitrile [Organic Syntheses, Collective Volume IV (1963), p. 234], that is to say heating the mixture of the reagents in the presence of ammonium acetate, with elimination of the water formed.

The compounds of Formula VII may be rearranged to the corresponding compounds of Formula III by heating in the presence of an inorganic or organic acid.

(2) The diester of Formula III may also be obtained with an isomeric cyclopropane diester, by the process shown schematically below:

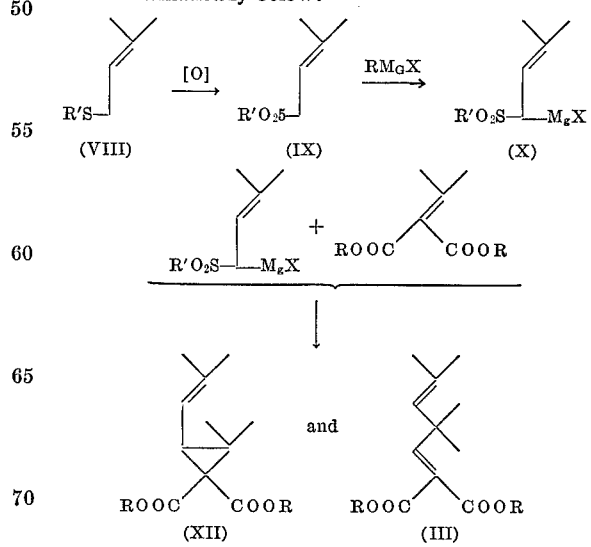

In these formulae R' represents phenyl, and R is as hereinbefore defined.

The sulphide of Formula VIII, which is for example, prepared as described in J. Chem. Soc. (1953) p. 3555, is oxidized to the sulphone of Formula IX. The usual methods for converting sulphides into sulphones may be applied, especially reaction of an aqueous solution of hydrogen peroxide with a solution of the sulphide in a mixture of acetic acid and acetic anhydride. The magnesium derivative of Formula X is prepared by reacting an alkyl-magnesium halide, for example ethylmagnesium bromide, with the sulphone is an appropriate solvent. After adding the sulphone of Formula IX to the magnesium derivative $RM_cX$, the mixture may be heated gently to bring about the reaction (that is to say until evolution of the compound RH, for example ethane, is complete). The magnesium derivative of Formula X is then condensed with the alkyl isopropylidene-malonate in the same medium as that used in the preparation of the derivative of Formula X, followed by hydrolysis with ice in the presence of an acid, in accordance with the conventional methods employed for syntheses with organo-magnesium compounds.

When the condensation of the compounds of Formula X and XI has been carried out in a solvent such as tetrahydrofuran, a crude product is obtained which consists about 95% of the compound of Formula XII, the rest being the isomeric compound of Formula III. The condensation may be carried out in the presence of a copper salt, e.g. cuprose chloride, in which case the yield of the mixture of isomeric derivatives is about 75%, or in the absence of a copper salt, in which case the overall yield of crude esters is a little lower.

If instead of being tetrahydrofuran, the solvent used as the reaction medium is diethyl ether, optionally mixed with a hydrocarbon, for example an aromatic hydrocarbon such as benzene, in the optional presence of a copper salt (for example cuprous chloride), a mixture of the isomeric compounds XII and III is still obtained, but this time the proportion of compound III becomes preponderant and can represent 50 to 75% of the crude mixture, which itself is obtained in a yield of about 50%.

The diacid of Formula II may also be prepared by total saponification of the nitrile-acid or nitrile-ester of formula:

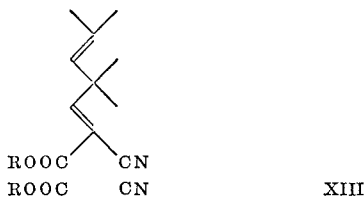

XIII or which may be obtained by a process analogous to that which gives the diester of Formula III, and more particularly by a process using the aldehydes of Formulae IV and V but replacing the malonic ester by a cyanacetic ester or by cyanacetic acid.

The examples which follow illustrate the invention and show how it may be put into practice.

EXAMPLE 1

(a) A mixture of:

2,2,4-trimethyl-3-pentenal—3.75 g.
Ethyl malonate—6 g.
Acetic acid—1 g.
Ammonium acetate—0.5 g.
Benzene—4 cm.³ is heated in an apparatus fitted with a reflux condenser for the separation of water. The mixture is raised to the boil and the water which forms is removed by azeotropic distillation. Once the reaction has ended, the mixture is cooled, washed with water and distilled. In this way a diester distilling at 105–110° C./0.2 mm. Hg is obtained, and its analysis shows that it is ethyl 2-ethoxycarbonyl-4,4,6-trimethyl-2,5-heptadienoate.

(b) On heating a mixture of the preceding diester with a solution of potassium hydroxide in ethylene glycol under reflux, and then extracting by the usual methods, 2 - carboxy - 4,4,6 - trimethyl - 2,5 - heptadienoic acid, M.P. 151–153° C., is obtained.

(c) On heating to 180° C. under reduced pressure (about 10 mm. Hg), the above diacid is converted into the lactone of Formula I which distills. The distillate crystallises (M.P. 51–53° C.). The yield is 87%, based on the above diacid.

The pyrocine so obtained may then be converted into chrysanthemic acid as described in French patent specification No. 1,269,127.

EXAMPLE 2

(a) A mixture of:

2,2,4-trimethyl-4-pentenal—50 g.
Ethyl malonate—79 g.
Acetic acid—13.1 g.
Ammonium acetate—6.6 g.
Benzene—50 cm.³ is heated in a 200 cm.³ flask fitted with a reflux condenser for the separation of water. The mixture is raised to the boil and the water which forms is removed by azeotropic distillation. After 15 hours heating, the mixture is cooled, washed with water and distilled. In this way 27.4 g. of ethyl 2 - ethoxycarbonyl - 4,4,6 - trimethyl - 2,6 - heptadienoate distilling at 107–109° C./0.16 mm. Hg, are obtained.

(b) On heating a mixture of this diester and formic acid, isomerisation takes place to give the ethyl 2-ethoxycarbonyl-4,4,6-trimethyl-2,5-heptadienoate.

The isomerisation also takes place if, instead of the formic acid, a mixture of acetic acid/hydrobromic acid/water is used.

(c) On proceeding as indicated in Examples 1(b) and (c), the diester arising from the isomerisation yields pyrocine.

EXAMPLE 3

(a) 108 cm.³ of a 30% (weight/volume) aqueous solution of hydrogen peroxide is added with stirring to a solution of 70 g. of 1 - phenylthio - 3 - methyl-butene-2 in 400 cm.³ of a mixture of equal parts of acetic anhydride and acetic acid, cooled by means of a mixture of ice and salt. The procedure followed is such as to keep the temperature of the mixture at about 0° C. The mixture is then left overnight without cooling, and 800 cm.³ of water are added. The sulphone precipitates, and is filtered off, washed and dried in vacuo. In this way 70 g. (=85% yield) of phenyl(3-methyl-butenyl-2)sulphone, melting at 51–52° C., are obtained.

(b) Ethylmagnesium bromide is prepared from 14.4 g. of ethyl bromide and 3 g. of magnesium, working in a diethyl ether medium, and 20 g. (0.1 mol) of phenyl(3-methyl-butenyl-2)sulphone mixed with 100 cm.³ of anhydrous benzene are then added. At the end of the addition, the mixture is heated on a water bath until the evolution of ethane ceases. A suspension is thus obtained and this is added to 10 g. of ethyl isopropylidene-malonate (0.05 mol) and 150 mg. of cuprous chloride in 20 cm.³ of anhydrous benzene, after which the mixture is heated for 2 hours at 70° C. It is then hydrolysed on ice acidified with 2 N hydrochloric acid, and the organic layer is separated, washed with water until neutral, and dried over anhydrous sodium sulphate. In this way 8 g. of a product distilling at 90–98° C./0.1 mm. Hg are obtained. This product separates into two constituents on vapour phase chromatography:

1,1-diethoxycarbonyl-2,2-dimethyl-3 - isobutenyl - cyclopropane, B.P. 80–84° C./0.2 mm. Hg which on saponification yields a diacid melting at 122–123° C.;
Ethyl 2-ethoxycarbonyl-4,4,6-trimethyl-2,5-heptadienoate, B.P. 105–110° C./0.2 mm. Hg which on saponification yields the corresponding diacid melting at 151–153° C.

The proportion of these two diesters in this experiment is one-third of cyclopropane diester to two-thirds of diene diester.

(c) The ethyl 2-ethoxycarbonyl-4,4,6 - trimethyl - 2,5-heptadienoate is saponified with a hot solution of potassium hydroxide in ethylene glycol, and the corresponding 2-carboxy-4,4,6-trimethyl-2,5-heptadienoic acid is then isolated by extraction by the usual methods.

(d) This diacid is then converted, by heating at 180° C. under reduced pressure (about 10 mm. Hg), into a product which distills and crystallises. Analysis of the product which has crystallised in this way and which melts at 51–53° C. shows that it is pyrocine.

This pyrocine may be converted into chrysanthemic acid by the procedure of French patent specification No. 1,269,127.

EXAMPLE 4

Working as in Example 1, and starting from the following amounts of raw materials:

2,2,4-trimethyl-3-pentenal—12.8 g.
Ethyl malonate—30 g.
Acetic acid—3 g.
Ammonium acetate—16 g.
Benzene—20 cm.$^3$ the reaction is over after 15 hours, and 8.5 g. of ethyl 2-ethoxycarbonyl-4,4,6-trimethyl - 2,5 - heptadienoate are obtained which, taking into account the aldehyde recovered, represents a yield of 51% of diester based on the aldehyde which has disappeared. The diester is converted into pyrocine by saponification followed by decarboxylation as in Example 1.

EXAMPLE 5

A mixture of the following compounds is heated under reflux for 15 hours whilst water is eliminated at the rate at which it is formed:

2,2,4-trimethyl-3-pentenal—12.8 g.
Cyanacetic acid—8.5 g.
Acetic acid—3 g.
Ammonium acetate—1.6 g.
Benzene—20 cm.$^3$ 2-cyano-4,4,6-trimethyl-2,5-heptadienoic acid melting at 104° C. is thus obtained in a yield of 50% based on the aldehyde which has disappeared.

Hot saponification with a concentrated solution of methanolic potassium hydroxide converts the acid obtained into the diacid, which may then be converted into pyrocine by decarboxylation as previously described.

I claim:
1. 2-carboxy-4,4,6-trimethyl-2,5-hetadienoic acid.

References Cited
UNITED STATES PATENTS 2,183,929   12/1939   Bowles et al. _____ 260—537
2,976,268   3/1961    Milford et al. _____ 260—537
3,082,251   3/1963    Brannock _____ 260—537

LORRAINE A. WEINBERGER, Primary Examiner

V. GARNER, Assistant Examiner

U.S. Cl. X.R.

260—343.6, 465.4, 468 P, 485 R, 514 P, 601 R, 607 A